(12) United States Patent
Chahine et al.

(10) Patent No.: US 9,930,324 B2
(45) Date of Patent: Mar. 27, 2018

(54) TIME BASED OFFSET CORRECTION FOR IMAGING SYSTEMS

(71) Applicant: Seek Thermal, Inc., Santa Barbara, CA (US)

(72) Inventors: Romeo Chahine, Goleta, CA (US); William J. Parrish, Santa Barbara, CA (US)

(73) Assignee: Seek Thermal, Inc., Santa Barbara, CA (US)

( * ) Notice: Subject to any disclaimer, the term of this patent is extended or adjusted under 35 U.S.C. 154(b) by 273 days.

(21) Appl. No.: 14/817,847

(22) Filed: Aug. 4, 2015

(65) Prior Publication Data
US 2016/0044306 A1 Feb. 11, 2016

Related U.S. Application Data

(60) Provisional application No. 62/033,374, filed on Aug. 5, 2014.

(51) Int. Cl.
*H04N 5/361* (2011.01)
*H04N 5/232* (2006.01)
(Continued)

(52) U.S. Cl.
CPC ......... *H04N 17/002* (2013.01); *H04N 5/2353* (2013.01); *H04N 5/23241* (2013.01);
(Continued)

(58) Field of Classification Search
CPC .. H04N 17/002; H04N 5/367; H04N 5/23241; H04N 5/361; H04N 5/2353; H04N 5/3651; H04N 5/33
(Continued)

(56) References Cited

U.S. PATENT DOCUMENTS

| 5,200,623 A | 4/1993 | Cannata |
| 6,140,948 A | 10/2000 | Yu |

(Continued)

FOREIGN PATENT DOCUMENTS

| EP | 1 083 740 | 3/2001 |
| EP | 1 601 185 | 11/2005 |

(Continued)

OTHER PUBLICATIONS

PCT International Search Report and Written Opinion for PCT/US2015/032671 dated Sep. 7, 2015 in 16 pages.

(Continued)

*Primary Examiner* — Lin Ye
*Assistant Examiner* — Chan T Nguyen
(74) *Attorney, Agent, or Firm* — Knobbe Martens Olson & Bear LLP (57) ABSTRACT

A method for offset correction in an imaging system comprising acquiring image data representative of at least a portion of a frame of pixel intensity values from the detector array at two times with a shutter closed. The method includes determining an offset value function for individual pixels based on the image data acquired with the shutter closed. The method includes acquiring subsequent scene image data with the shutter open, and adjusting the scene image data relative to the flat field as predicted by the offset value function at the time the scene image data was acquired to correct for offset drift of the imaging system. In some embodiments, the imaging array is an infrared Focal Plane Array (IR FPA) in a thermal imaging camera.

15 Claims, 8 Drawing Sheets

(51) Int. Cl.
   *H04N 5/367* (2011.01)
   *H04N 17/00* (2006.01)
   *H04N 5/235* (2006.01)
   *H04N 5/33* (2006.01)
   *H04N 5/365* (2011.01)

(52) U.S. Cl.
   CPC .............. *H04N 5/33* (2013.01); *H04N 5/361* (2013.01); *H04N 5/367* (2013.01); *H04N 5/3651* (2013.01)

(58) Field of Classification Search
   USPC ............ 250/208.1, 330–334, 336.1; 348/241
   See application file for complete search history.

(56) References Cited

U.S. PATENT DOCUMENTS

| | | | |
|---|---|---|---|
| 6,252,995 | B1 | 6/2001 | Takamori |
| 6,730,909 | B2 | 5/2004 | Butler |
| 6,757,442 | B1 | 6/2004 | Avinash |
| 7,772,557 | B2* | 8/2010 | Anderson ............... H04N 5/33 250/252.1 |
| 7,795,578 | B2 | 9/2010 | Högasten et al. |
| 7,796,168 | B1 | 9/2010 | Kostrzewa et al. |
| 7,982,652 | B2 | 7/2011 | Simony et al. |
| 7,995,859 | B2 | 8/2011 | Högasten |
| 8,189,050 | B1 | 5/2012 | Hughes et al. |
| 8,208,026 | B2 | 6/2012 | Högasten et al. |
| 8,208,755 | B1 | 6/2012 | Högasten |
| 8,306,275 | B2 | 11/2012 | Högasten |
| 8,340,414 | B2 | 12/2012 | Högasten et al. |
| 8,373,757 | B1 | 2/2013 | Nguyen |
| 8,378,290 | B1 | 2/2013 | Speake et al. |
| 8,428,385 | B2 | 4/2013 | Whiteside et al. |
| 8,737,760 | B2 | 5/2014 | Olsson et al. |
| 8,780,208 | B2 | 7/2014 | Högasten et al. |
| 9,332,186 | B2 | 5/2016 | Johansson et al. |
| 9,335,352 | B2 | 5/2016 | McCrea et al. |
| 2002/0022938 | A1 | 2/2002 | Butler |
| 2002/0074499 | A1 | 6/2002 | Butler |
| 2002/0146345 | A1 | 10/2002 | Neilson |
| 2004/0012676 | A1 | 1/2004 | Weiner |
| 2005/0099504 | A1 | 5/2005 | Nayar |
| 2005/0179468 | A1 | 8/2005 | Zhou |
| 2006/0092297 | A1 | 5/2006 | Lee et al. |
| 2006/0139198 | A1 | 6/2006 | Rao et al. |
| 2006/0193509 | A1 | 8/2006 | Criminisi |
| 2007/0147698 | A1 | 6/2007 | Reid |
| 2009/0073278 | A1 | 3/2009 | Ogawa et al. |
| 2009/0273675 | A1* | 11/2009 | Jonsson ................ H04N 5/33 348/164 |
| 2010/0039306 | A1 | 2/2010 | Simony et al. |
| 2010/0141768 | A1* | 6/2010 | Liberman ............ H04N 5/2353 348/164 |
| 2010/0238294 | A1 | 9/2010 | Högasten et al. |
| 2011/0141368 | A1 | 6/2011 | Wallace et al. |
| 2013/0064449 | A1 | 3/2013 | Menikoff |
| 2013/0077888 | A1 | 3/2013 | Meyers et al. |
| 2013/0147966 | A1 | 6/2013 | Kostrzewa et al. |
| 2013/0169819 | A1 | 7/2013 | Strandemar |
| 2013/0222604 | A1 | 8/2013 | Ingerhed et al. |
| 2013/0242125 | A1 | 9/2013 | Yang et al. |
| 2013/0250125 | A1 | 9/2013 | Garrow et al. |
| 2013/0258131 | A1 | 10/2013 | Hashimoto et al. |
| 2013/0268212 | A1 | 10/2013 | Makarov et al. |
| 2013/0300875 | A1 | 11/2013 | Strandemar et al. |
| 2014/0015921 | A1 | 1/2014 | Foi et al. |
| 2014/0016879 | A1 | 1/2014 | Högasten et al. |
| 2014/0037225 | A1 | 2/2014 | Högasten et al. |
| 2014/0078360 | A1 | 3/2014 | Park et al. |
| 2014/0092257 | A1 | 4/2014 | Högasten et al. |
| 2014/0092258 | A1 | 4/2014 | Dart et al. |
| 2014/0168445 | A1 | 6/2014 | Högasten et al. |
| 2014/0247365 | A1 | 9/2014 | Gardner et al. |
| 2014/0313343 | A1 | 10/2014 | Frank et al. |
| 2014/0313385 | A1 | 10/2014 | Sato et al. |
| 2014/0355902 | A1 | 12/2014 | Olsson |
| 2014/0355904 | A1 | 12/2014 | Olsson |
| 2015/0146009 | A1 | 5/2015 | Kostrzewa et al. |
| 2015/0187144 | A1 | 7/2015 | Roth |
| 2015/0310594 | A1 | 10/2015 | Olsson |
| 2015/0312488 | A1 | 10/2015 | Kostrzewa et al. |
| 2015/0312489 | A1 | 10/2015 | Hoelter et al. |
| 2015/0316473 | A1* | 11/2015 | Kester .................. G01J 3/0256 250/339.02 |
| 2015/0319379 | A1 | 11/2015 | Nussmeier et al. |
| 2015/0350567 | A1 | 12/2015 | Parrish et al. |
| 2016/0041039 | A1 | 2/2016 | Olsson |
| 2016/0042500 | A1 | 2/2016 | Engberg et al. |
| 2016/0044306 | A1 | 2/2016 | Chahine et al. |
| 2016/0056785 | A1 | 2/2016 | Wolfe et al. |
| 2016/0057369 | A1 | 2/2016 | Wolfe et al. |
| 2016/0061883 | A1 | 3/2016 | Engberg et al. |
| 2016/0156858 | A1 | 6/2016 | Lee et al. |
| 2016/0198102 | A1 | 7/2016 | Chahine et al. |
| 2016/0202117 | A1 | 7/2016 | Hosking |
| 2016/0203694 | A1 | 7/2016 | Högasten et al. |
| 2016/0323525 | A1 | 11/2016 | Lee |

FOREIGN PATENT DOCUMENTS

| | | |
|---|---|---|
| EP | 1667 066 | 6/2006 |
| EP | 2 157 699 | 2/2010 |
| EP | 2 618 560 | 7/2013 |
| EP | 2 645 577 | 10/2013 |
| WO | WO 2013/084809 | 6/2013 |
| WO | WO 2013/191611 | 12/2013 |
| WO | WO 2014/106210 | 7/2014 |

OTHER PUBLICATIONS

PCT International Search Report and Written Opinion for PCT/US042826 dated Oct. 16, 2015 in 12 pages.
PCT International Search Report and Written Opinion for PCT/US043547 dated Oct. 9, 2015 in 11 pages.
PCT International Search Report and Written Opinion for PCT/US045656 dated Oct. 21, 2015 in 12 pages.
Badamchizadeh, et al., Image and Graphics, Comparative Study of Unsharp Masking Methods for Image Enhancement, 2004, pp. 27-30.
PCT International Search Report and Written Opinion for PCT/US2015/063111 dated May 17, 2016 in 13 pages.
Dynamic-range compression and contrast enhancement in infrared imaging systems.
"The Integrator Amplifier," Electronics Tutorials, http://www.electronics-tutorials.ws/opamp/opamp_6.html, accessed Sep. 22, 2016.

* cited by examiner

TIME BASED OFFSET CORRECTION FOR IMAGING SYSTEMS

CROSS-REFERENCE TO RELATED APPLICATIONS

This application claims the benefit of priority to U.S. Prov. Pat. App'n No. 62/033,374, filed Aug. 5, 2014, entitled "Time Based Offset Correction for Imaging Systems," which is incorporated by reference herein in its entirety.

BACKGROUND

Field

The present disclosure generally relates to offset correction for imaging systems, such as cameras including infrared cameras, and in particular to systems and methods for correcting pixel offsets as a function of time.

Description of Related Art

The increasing availability of high-performance, low-cost uncooled infrared imaging devices, such as bolometer focal plane arrays (FPAs), is enabling the design and production of mass-produced, consumer-oriented infrared (IR) cameras capable of quality thermal imaging. Such thermal imaging sensors have long been expensive and difficult to produce, thus limiting the employment of high-performance, long-wave imaging to high-value instruments, such as aerospace, military, or large-scale commercial applications. Mass-produced IR cameras may have different design requirements than complex military or industrial systems. New approaches to correction terms, such as pixel offset, may be desirable for low-cost, mass-produced systems.

SUMMARY

Example embodiments described herein have innovative features, no single one of which is indispensable or solely responsible for their desirable attributes. Without limiting the scope of the claims, some of the advantageous features will now be summarized.

In some embodiments, an imaging system can be configured to apply an offset correction to image data acquired with an imaging sensor. The imaging system can determine an appropriate offset correction value for pixels of the imaging sensor, the offset correction value being a function of time that is based on data previously acquired with an imaging sensor. The imaging system can be configured to determine and to apply the offset correction without determining or calibrating a temperature of the imaging array.

In some embodiments, a method may be provided for offset correction of a digital image. The method can be employed in an imaging system that includes a shutter, an imaging array comprising a plurality of photodetectors or pixels, and detector electronic circuitry for reading out image data from the array of photodetectors. The method includes closing a shutter and, with the shutter closed, acquiring image data at a first shutter closed time, tc1, the image data representative of pixel intensity values from the array of photodetectors and corresponding to a flat field intensity for the imaging array. The method includes closing the shutter and, with the shutter closed, acquiring image data at a second shutter closed time, tc2, later than the first shutter closed time, tc1. The method includes, for individual pixels in the image data, determining an offset value function, $I_c(t)$, configured to predict a pixel offset value as a function of time wherein the prediction is based on the acquired flat field image data at shutter closed times tc1 and tc2. The offset value function is configured to predict the flat field intensity for the array of pixels as a function of time. The method includes opening a shutter and, with the shutter open, acquiring image data of a scene at a first shutter open time, to1, later than the second shutter closed time, to1>tc2. The method includes adjusting the acquired image data of the scene, wherein the adjustment of an individual pixel in the image data of the scene is based at least in part on an output of the offset value function for the individual pixel at the first shutter open time, $I_c(to1)$. The method thereby corrects for offset drift of pixels in the imaging system.

In some implementations, the method includes closing the shutter intermittently after the first shutter open time, to1, and acquiring image data with the shutter closed at a plurality of shutter closed times. The method includes updating the offset value function, $I_c(t)$, based on image data acquired with the shutter closed at a latest shutter closed time, tcN, and image data acquired with the shutter closed at one or more shutter closed times prior to the latest shutter closed time. The method includes acquiring, with the shutter open, image data of the scene at shutter open times later than the latest shutter closed time and adjusting the acquired image data using the updated offset value function.

In some implementations, adjusting the acquired image data of the scene comprises, for individual pixels, subtracting an offset pixel value that is based on the predicted flat field intensity from the acquired image data of the scene, wherein the offset pixel value is a value that would adjust the individual pixel to have a substantially uniform output with other pixels of the imaging array at the time the image data was acquired.

In some implementations, the offset value function is determined by fitting a linear equation to image data acquired with the shutter closed at two or more shutter closed times. In certain implementations, the offset value function is determined using image data acquired with the shutter closed at consecutive shutter closed times. In certain implementations, the offset value function is determined using image data acquired with the shutter closed at non-consecutive shutter closed times. In some implementations, after a tailored length of time, the offset value function is determined by using Lagrangian interpolation or fitting a 2nd degree polynomial equation to image data acquired with the shutter closed at three or more shutter closed times.

In some embodiments, the imaging array is an infrared focal plane array (IR FPA) in a thermal imaging camera. In some embodiments, the offset value function can be determined without measuring a temperature of any component in the imaging system, such as the imaging array. In some embodiments, adjusting the image data is performed without utilizing any measured or determined temperature of the imaging array.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to using flat field image data (e.g., image data acquired while a shutter is closed) acquired at different times to predict pixel offset values and to adjust image data using the predicted pixel offset values. This can be done to adjust for non-uniformities in pixel responses, for example. The present disclosure includes systems and methods to adjust image data to account for pixel offset values that change over time due at least in part to temperature changes at the imaging array. To account for these changing offset values, the systems and methods acquire flat field data at a plurality of times to determine a function that represents predicted offset drift of pixels over time. These systems and methods can use linear equations, quadratic equations, Lagrangian interpolation, or the like to characterize and to predict pixel offset values as a function of time. Thus, in some embodiments, these systems and methods can account for changing offset values without using an accurate temperature measurement or any temperature measurement at all. In some embodiments, an imaging system can account for changing offset values using a combination of measured temperature and time-based behavior. Due at least in part to the imaging system being able to characterize offset value drift as a function of time rather than or in addition to temperature, the imaging system can correct for offset drift without accurate temperature measurements and/or without using measurements from any temperature sensors. Advantageously, this can allow the imaging system to be built without temperature sensors configured to determine a temperature of the imaging array and/or associated components. Similarly, this can allow the imaging system to use relatively inexpensive temperature sensors with the imaging array. This can reduce manufacturing costs and/or complexity of the imaging system.

Although examples and implementations described herein focus, for the purpose of illustration, on implementation in an infrared camera core using a focal plane array, the systems and methods disclosed herein can be implemented in digital and/or video cameras that acquire visible light using a variety of image sensors. Similarly, the imaging systems described herein can be implemented with different shuttering systems. Various aspects of the disclosure will now be described with regard to certain examples and embodiments, which are intended to illustrate but not limit the disclosure.

Some embodiments described herein provide offset corrections in image data that account for non-uniformities and drift in offset values of pixels caused at least in part by variations in temperature at an imaging array, where the offset corrections are advantageously applied without using a measured temperature of the imaging array. Advantageously, this allows the disclosed offset correction methods to be performed in systems that do not measure temperature of the imaging array. Advantageously, this allows the disclosed offset correction methods to be performed as a fail-safe or to provide redundancy in systems that utilize offset correction methods based on temperature measurements.

Some embodiments described herein provide an accurate offset correction for imaging arrays without temperature sensors or with inaccurate temperature sensors. Advantageously, the disclosed offset correction methods can be implemented in low-cost imaging systems that do not include temperature sensors or that include inexpensive and inaccurate temperature sensors.

Some embodiments described herein provide an offset correction process that is based on time instead of, or in addition to, temperature. Advantageously, imaging systems utilizing the disclosed offset correction methods can benefit from redundancy, fail-safes, and/or improved accuracy in offset correction processes by combining time-based and temperature-based methods.

The disclosed offset correction methods may be implemented as modules that may be a programmed computer method or a digital logic method and may be implemented using a combination of any of a variety of analog and/or digital discrete circuit components (transistors, resistors, capacitors, inductors, diodes, etc.), programmable logic, microprocessors, microcontrollers, application-specific integrated circuits, or other circuit elements. A memory configured to store computer programs or computer-executable instructions may be implemented along with discrete circuit components to carry out one or more of the methods described herein. In certain implementations, the disclosed methods may be implemented in conjunction with a focal plane array (FPA) on a camera core, wherein the processor and memory components executing the disclosed methods may be on a device mated to the camera core, such as a mobile appliance including smart phones, tablets, personal computers, etc. In some implementations, the processing and memory elements of the imaging system may be in programmable logic or on-board processors that are part of the core or camera system. In some embodiments, image frame acquisition and bias or offset adjustment may be accomplished on a processing element on the camera core, and further image processing and display may be accomplished by a system controller mated to the core.

As a particular example of some advantages provided by the disclosed systems and methods, an imaging system can include a focal plane array (FPA) configured to acquire images of a scene. The FPA can include a two-dimensional array of N detectors, the FPA configured to output a two-dimensional image of the scene. For imaging purposes, image frames, typically data from all or some of the detectors $N_f$, are produced by the FPA, each successive frame containing data from the array captured in successive time windows. Thus, a frame of data delivered by the FPA comprises $N_f$ digital words, each word representing a particular pixel, P, in the image. These digital words are usually of a length determined by the analog to digital conversion (A/D) process. For example, if the pixel data is converted with a 14 bit A/D, the pixel words may be 14 bits in length, and there may be 16384 counts per word. For an IR camera used as a thermal imaging system, these words may correspond to an intensity of radiation measured by each pixel in the array. In a particular example, for a bolometer IR FPA the intensity per pixel usually corresponds to temperature of the corresponding part of the imaged scene, with lower values corresponding to colder regions and higher values to hotter regions. It may be desirable to display this data on a visual display.

Each pixel in an FPA may include a radiation detector that generates relatively small signals in response to detected radiation, such as in an infrared imaging array. These signals may be relatively small compared to signals or signal levels in the FPA arising from sources not caused by incident radiation, or non-image signals, wherein these non-image signals are related to the materials, structure, and/or components of the FPA. For example, pixels in an FPA can include interface circuitry including resistor networks, transistors, and capacitors on a readout integrated circuit (ROIC) that may be directly interfaced to the array of detectors. For instance, a microbolometer detector array, a microelectrical mechanical system (MEMS) device, may be manufactured using a MEMS process. The associated ROIC, however, may be fabricated using electronic circuit techniques. These two components can be combined together to form the FPA. The combination of the interface circuitry and the detector itself may have offset and temperature behaviors that are relatively large compared to the signals produced in response to incident radiation on the detectors. Thus, it is often desirable to compensate for these effects that are not related to the image signal before displaying or otherwise processing the image data.

Example Imaging Systems

Figure 1A:
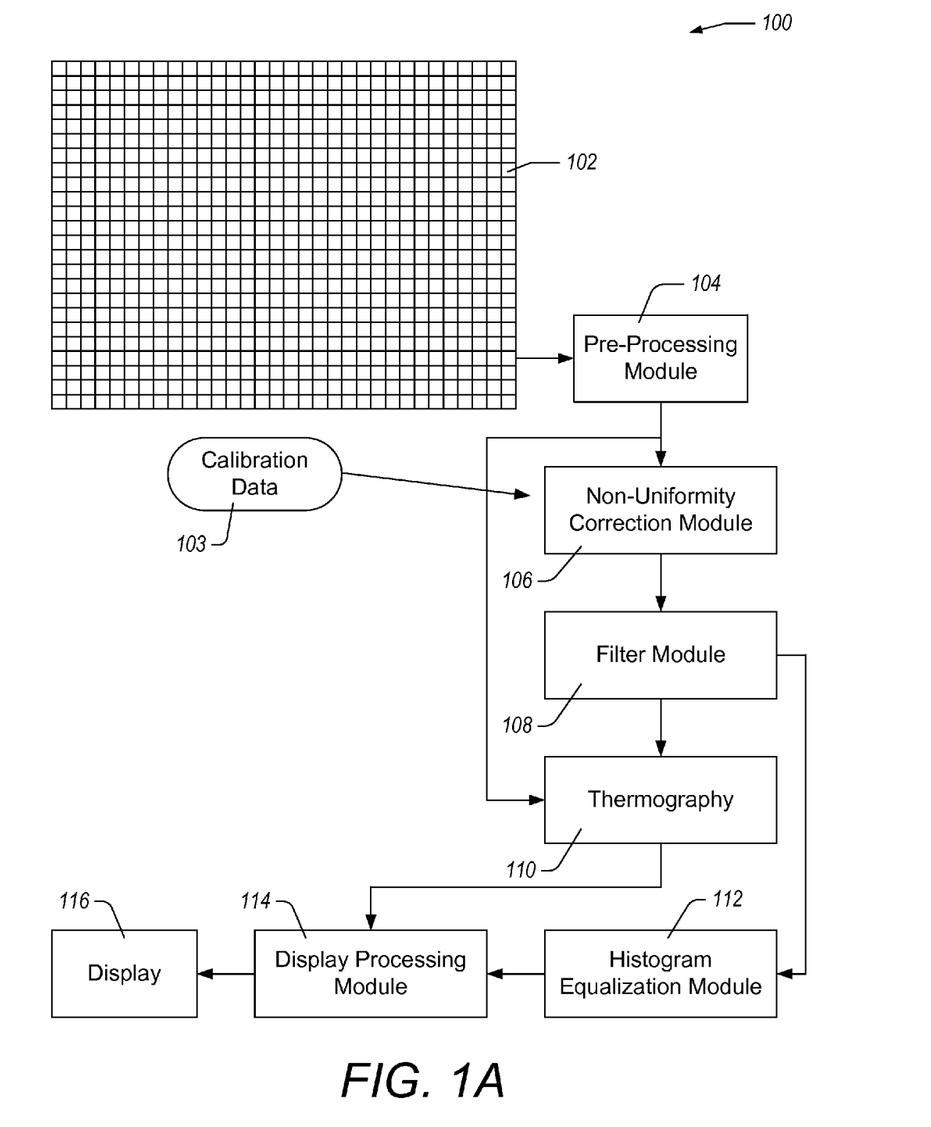
FIG. 1A illustrates a functional block diagram of an example imaging system.

FIG. 1A illustrates a functional block diagram of an imaging system 100 comprising an image sensor such as a focal plane array 102, a pre-processing module 104, a non-uniformity correction module 106, a filter module 108, a thermography module 110, a histogram equalization module 112, a display processing module 114, and a display 116. The focal plane array 102 can output a sequence of frames of intensity data (e.g., images, thermal images, etc.). Each frame can include an array of pixel values, each pixel value representing light intensity detected by a corresponding pixel on the focal plane array 102. The pixel values can be read out of the focal plane array 102 as a stream of serial digital data. In some embodiments, the pixel values are read out of the focal plane array 102 using read out electronics that process whole rows or whole columns of the focal plane array 102. The format of the stream of data can be configured to conform to a desired, standard, or pre-defined format. The stream of digital data can be displayed as a two-dimensional image, such as by the display 116.

In some embodiments, the focal plane array 102 can be an array of microbolometers integrated with a readout integrated circuit ("ROTC"). The array of microbolometers can be configured to generate electrical signals in response to a quantity of thermal radiation or a temperature. The ROTC can include buffers, integrators, analog-to-digital converters, timing components, and the like to read the electrical signals from the array of microbolometers and to output a digital signal (e.g., 14-bit serial data separated into image frames). Additional examples of systems and methods associated with the focal plane array 102 are disclosed in U.S. patent application Ser. No. 14/292,124, entitled "Data Digitization and Display for an Imaging System," filed May 30, 2014, the entire contents of which is incorporated by reference herein.

The focal plane array 102 can have calibration or other monitoring information associated with it (e.g. calibration data 103) that can be used during image processing to generate a superior image. For example, calibration data 103 may include bad pixel maps, and/or gain tables stored in data storage and retrieved by modules in the imaging system 100 to correct and/or adjust the pixel values provided by the focal plane array 102. Calibration data 103 may include gain tables. As described herein, the focal plane array 102 can include a plurality of pixels with integrated readout electronics. The readout electronics can have a gain associated with it, wherein the gain may be proportional to the transimpedance of a capacitor in the electronics. This gain value, which may in some implementations take the form of a pixel gain table, may be used by the image processing modules of the imaging system 100. Additional examples of calibration data for the imaging system 100 are provided in U.S. Prov. App. No. 62/039,579, entitled "Gain Calibration for an Imaging System," filed Aug. 20, 2015, the entire contents of which is incorporated by reference herein. The calibration data 103 can be stored on the imaging system 100 or in data storage on another system for retrieval during image processing.

The imaging system 100 includes one or more modules configured to process image data from the focal plane array 102. One or more of the modules of the imaging system 100 can be eliminated without departing from the scope of the disclosed embodiments. The following modules are described to illustrate the breadth of functionality available to the disclosed imaging systems and not to indicate that any individual module or described functionality is required, critical, essential, or necessary.

The imaging system 100 includes the pre-processing module 104. The pre-processing module 104 can be configured to receive the digital data stream from the focal plane array 102 and to perform pre-processing functions. Examples of such functions include frame averaging, high-level frame-wide filtering, etc. The pre-processing module 104 can output serial digital data for other modules.

As an example, the pre-processing module 104 can include conditional summation functionality configured to implement integration and averaging techniques to increase apparent signal to noise in image data. For example, the conditional summation functionality can be configured to combine successive frames of digitized image data to form a digitally integrated image. This digitally integrated image can also be averaged to reduce noise in the image data. The conditional summation functionality can be configured to sum values from successive frames for each pixel from the focal plane array 102. For example, the conditional summation functionality can sum the values of each pixel from four successive frames and then average that value. In some implementations, the conditional summation functionality can be configured to select a best or preferred frame from successive frames rather than summing the successive frames. Examples of these techniques and additional embodiments are disclosed in U.S. patent application Ser. No. 14/292,124, entitled "Data Digitization and Display for an Imaging System," filed May 30, 2014, the entire contents of which is incorporated by reference herein.

As another example, the pre-processing module 104 can include adaptive resistor digital to analog converter ("RDAC") functionality configured to determine and/or adjust for operating bias points of the focal plane array 102. For example, for an imaging system that includes a shutter, the imaging system 100 can be configured to adjust an operating bias point of the detectors in the focal plane array 102. The adaptive RDAC functionality can implement an adaptive operating bias correction method that is based at least in part on periodic measurement of a flat field image (e.g., an image acquired with the shutter closed). The adaptive RDAC functionality can implement an ongoing adjustment of the operating bias based at least in part on a measured or detected drift over time of the flat field image. The bias adjustment provided by the adaptive RDAC functionality may provide compensation for drift over time of the photodetectors and electronics due to effects such as temperature changes. In some embodiments, the adaptive RDAC functionality includes an RDAC network that can be adjusted to bring measured flat field data closer to a reference bias level. Additional examples of systems and methods related to the adaptive RDAC functionality are provided in U.S. Prov. App. No. 62/039,566, entitled "Adaptive Adjustment of the Operating Bias of an Imaging System," filed Aug. 20, 2014, the entire contents of which is incorporated by reference herein.

After the pre-processing module 104, other processing modules can be configured to perform a series of pixel-by-pixel or pixel group processing steps. For example, the image processing system 100 includes a non-uniformity correction module 106 configured to adjust pixel data for gain and offset effects that are not part of the image scene itself, but are artifacts of the sensor. For example, the non-uniformity correction module 106 can be configured to receive a stream of digital data and correct pixel values for non-uniformities in the focal plane array 102. In some imaging systems, these corrections may be derived by intermittently closing a shutter over the focal plane array 102 to acquire uniform scene data. From this acquired uniform scene data, the non-uniformity correction module 106 can be configured to determine deviations from uniformity. The non-uniformity correction module 106 can be configured to adjust pixel data based on these determined deviations. In some imaging systems, the non-uniformity correction module 106 utilizes other techniques to determine deviations from uniformity in the focal plane array. Some of these techniques can be implemented without the use of a shutter. Additional examples of systems and methods for non-uniformity correction are described in greater detail herein with reference to FIGS. 2A-7.

After the pre-processing module 104, the imaging system 100 can include a high/low $C_{int}$ signal processing functionality configured to receive a stream of digital data (e.g., 14-bit serial data) from the pre-processing module 104. The high/low $C_{int}$ functionality can be configured to process the stream of digital data by applying gain tables, for example, as provided in the calibration data 103. The high/low $C_{int}$ functionality can be configured to process the stream of digital data using output of high/low integration components. Such high/low integration components can be integrated with the ROIC associated with the focal plane array 102. Examples of the high/low integration components are described in U.S. patent application Ser. No. 14/292,124, entitled "Data Digitization and Display for an Imaging System," filed May 30, 2014, the entire contents of which is incorporated by reference herein.

The image processing system 100 includes a filter module 108 configured to apply one or more temporal and/or spatial filters to address other image quality issues. For example, the readout integrated circuit of the focal plane array can introduce artifacts into an image, such as variations between rows and/or columns. The filter module 108 can be configured to correct for these row- or column-based artifacts, as described in greater detail in U.S. patent application Ser. No. 14/702,548, entitled "Compact Row Column Noise Filter for an Imaging System," filed May 1, 2015, the entire contents of which is incorporated by reference herein. The filter module 108 can be configured to perform corrections to reduce or eliminate effects of bad pixels in the image, enhance edges in the image data, suppress edges in the image data, adjust gradients, suppress peaks in the image data, and the like.

For example, the filter module 108 can include bad pixel functionality configured to provide a map of pixels on the focal plane array 102 that do not generate reliable data. These pixels may be ignored or discarded. In some embodiments, data from bad pixels is discarded and replaced with data derived from neighboring, adjacent, and/or near pixels. The derived data can be based on interpolation, smoothing, averaging, or the like.

As another example, the filter module 108 can include thermal gradient functionality configured to adjust pixel values based on thermal gradients present in the image data but that are not part of the scene imaged by the imaging system 100. The thermal gradient functionality can be configured to use local flat scene data to derive data to improve image quality by correcting for thermal gradients produced in the imaging system 100. Examples of determining corrections for the thermal gradient functionality are described in greater detail in U.S. Prov. App. No. 62/086,305, entitled "Image Adjustment Based on Locally Flat Scenes," filed Dec. 2, 2014, the entire contents of which is incorporated by reference herein.

The filter module 108 can include peak limit functionality configured to adjust outlier pixel values. For example, the peak limit functionality can be configured to clamp outlier pixel values to a threshold value.

The filter module 108 can be configured to include an adaptive low-pass filter and/or a high-pass filter. In some embodiments, the imaging system 100 applies either the adaptive low-pass filter or the high-pass filter, but not both. The adaptive low-pass filter can be configured to determine locations within the pixel data where it is likely that the pixels are not part of an edge-type image component. In these locations, the adaptive low-pass filter can be configured to replace pixel data with smoothed pixel data (e.g., replacing pixel values with the average or median of neighbor pixels). This can effectively reduce noise in such locations in the image. The high-pass filter can be configured to enhance edges by producing an edge enhancement factor that may be used to selectively boost or diminish pixel data for the purpose of edge enhancement. Additional examples of adaptive low-pass filters and high-pass filters are described in U.S. Prov. App. No. 62/069,511, entitled "Local Contrast Adjustment for Digital Images," filed Oct. 28, 2014, and U.S. Prov. App. No. 62/033,364, entitled "Local Contrast Edge Enhancement for Digital Images," filed Aug. 5, 2014, the entire contents of each of which is incorporated by reference herein.

The filter module 108 can be configured to apply optional filters to the image data. For example, optional filters can include, without limitation, averaging filters, median filters, smoothing filters, and the like. The optional filters can be turned on or off to provide targeted or desired effects on the image data.

The image processing system 100 includes a thermography module 110 configured to convert intensity to temperature. The light intensity can correspond to intensity of light from a scene and/or from objects in a field of view of the imaging system 100. The thermography module 110 can be configured to convert the measured light intensities to temperatures corresponding to the scene and/or objects in the field of view of the imaging system 100. The thermography module 110 can receive as input calibration data (e.g., calibration data 103). The thermography module 110 may also use as inputs raw image data (e.g., pixel data from the pre-processing module 104) and/or filtered data (e.g., pixel data from the filter module 108). Examples of thermography modules and methods are provided in U.S. Prov. App. No. 62/043,005, entitled "Image Display and Thermography for a Thermal Imaging Camera," filed Aug. 28, 2014, the entire contents of which is incorporated by reference herein.

The image processing system 100 includes a histogram equalization module 112, or other display conversion module, configured to prepare the image data for display on the display 116. In some imaging systems, the digital resolution of the pixel values from the focal plane array 102 can exceed the digital resolution of the display 116. The histogram equalization module 112 can be configured to adjust pixel values to match the high resolution value of an image or a portion of an image to the lower resolution of the display 116. The histogram module 112 can be configured to adjust pixel values of the image in a manner that avoids using the limited display range of the display 116 on portions of the image where there is little or no data. This may be advantageous for a user of the imaging system 100 when viewing images acquired with the imaging system 100 on the display 116 because it can reduce the amount of display range that is not utilized. For example, the display 116 may have a digital brightness scale, which for an infrared image corresponds to temperature where higher intensity indicates a higher temperature. However, the display brightness scale, for example a grey scale, is generally a much shorter digital word than the pixel sample words. For instance, the sample word of the pixel data may be 14 bits while a display range, such as grey scale, can be typically 8 bits. So for display purposes, the histogram equalization module 112 can be configured to compress the higher resolution image data to fit the display range of the display 116. Examples of algorithms and methods that may be implemented by the histogram equalization module 112 are disclosed in U.S. patent application Ser. No. 14/292,124, entitled "Data Digitization and Display for an Imaging System," filed May 30, 2014, the entire contents of which is incorporated by reference herein.

The imaging system 100 includes a display processing module 114 configured to prepare the pixel data for display on the display 116 by, for example, selecting color tables to convert temperatures and/or pixel values to color on a color display. As an example, the display processing module can include a colorizer lookup table configured to convert pixel data and/or temperature data into color images for display on the display 116. The colorizer lookup table can be configured to display different temperatures of a thermally imaged scene using different color display lookup tables depending at least in part on the relationship of a temperature of a given scene to a threshold temperature. For example, when a thermal image of a scene is displayed, various temperatures of the scene may be displayed using different lookup tables depending on their relationship to the input temperature. In some embodiments, temperatures above, below, or equal to an input temperature value may be displayed using a color lookup table, while other temperatures may be displayed using a grey scale lookup table. Accordingly, the colorizer lookup table can be configured to apply different colorizing lookup tables depending on temperature ranges within a scene in combination with user preferences or selections. Additional examples of functionality provided by a display processing module are described in U.S. Prov. App. No. 62/049,880, entitled "Selective Color Display of a Thermal Image," filed Sep. 12, 2014, the entire contents of which is incorporated herein by reference in its entirety.

The display 116 can be configured display the processed image data. The display 116 can also be configured to accept input to interact with the image data and/or to control the imaging system 100. For example, the display 116 can be a touchscreen display.

The imaging system 100 can be provided as a standalone device, such as a thermal sensor. For example, the imaging system 100 can include an imaging system housing configured to enclose hardware components (e.g., the focal plane array 102, read out electronics, microprocessors, data storage, field programmable gate arrays and other electronic components, and the like) of the imaging system 100. The imaging system housing can be configured to support optics configured to direct light (e.g., infrared light, visible light, etc.) onto the image sensor 102. The housing can include one or more connectors to provide data connections from the imaging system 100 to one or more external systems. The housing can include one or more user interface components to allow the user to interact with and/or control the imaging system 100. The user interface components can include, for example and without limitation, touch screens, buttons, toggles, switches, keyboards, and the like.

In some embodiments, the imaging system 100 can be part of a network of a plurality of imaging systems. In such embodiments, the imaging systems can be networked together to one or more controllers.

Figure 1B:
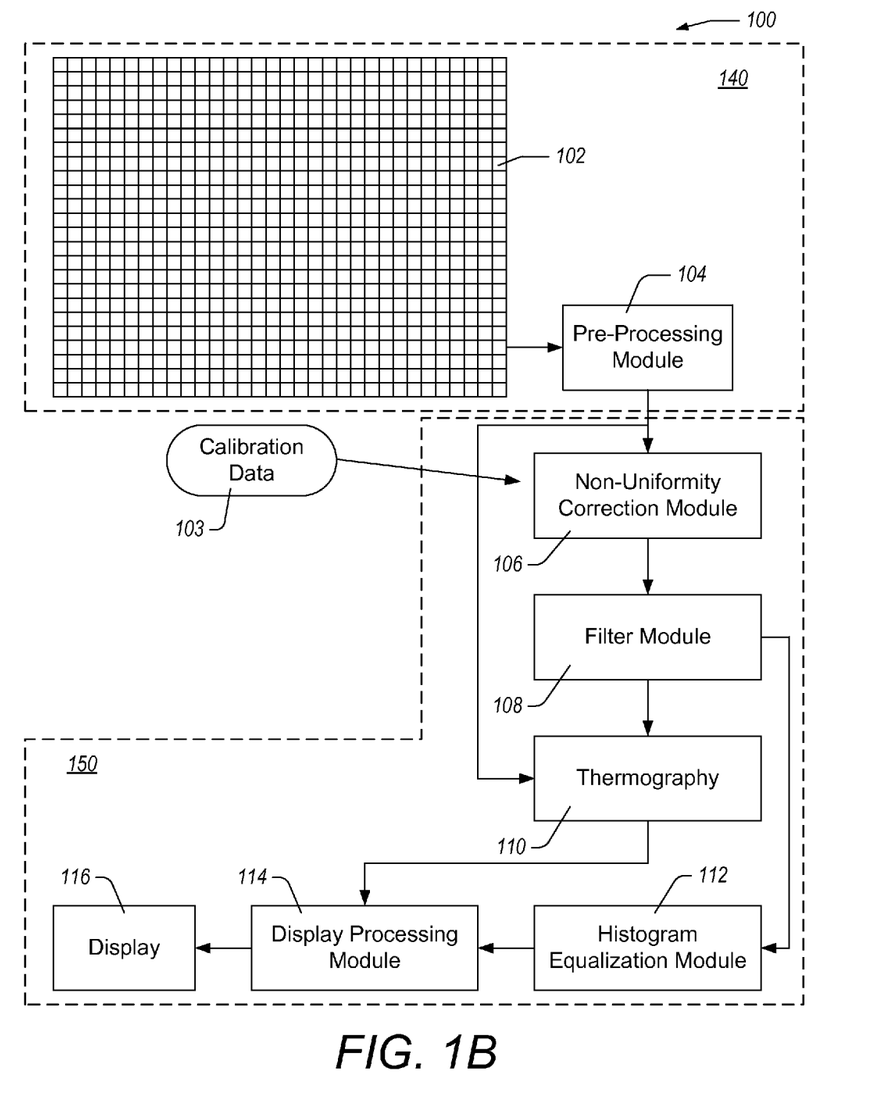
FIG. 1B illustrates a functional block diagram of the example imaging system illustrated in FIG. 1A, wherein functionality of the imaging system is divided between a camera and a mobile electronic device.

FIG. 1B illustrates a functional block diagram of the example imaging system 100 illustrated in FIG. 1A, wherein functionality of the imaging system 100 is divided between a camera or sensor 140 and a mobile electronic device 150. By dividing image acquisition, pre-processing, signal processing, and display functions among different systems or devices, the camera 140 can be configured to be relatively low-power, relatively compact, and relatively computationally efficient compared to an imaging system that performs a majority or all of such functions on board. As illustrated in FIG. 1B, the camera 140 is configured to include the focal plane array 102 and the pre-processing module 104. In some embodiments, one or more of the modules illustrated as being part of the mobile electronic device 150 can be included in the camera 140 instead of in the mobile electronic device 150. In some embodiments, certain advantages are realized based at least in part on the division of functions between the camera 140 and the mobile electronic device 150. For example, some pre-processing functions can be implemented efficiently on the camera 140 using a combination of specialized hardware (e.g., field-programmable gate arrays, application-specific integrated circuits, etc.) and software that may otherwise be more computationally expensive or labor intensive to implement on the mobile electronic device 150. Accordingly, an aspect of at least some of the embodiments disclosed herein includes the realization that certain advantages may be achieved by selecting which functions are to be performed on the camera 140 (e.g., in the pre-processing module 104) and which functions are to be performed on the mobile electronic device 150 (e.g., in the thermography module 110).

An output of the camera 140 can be a stream of digital data representing pixel values provided by the pre-processing module 104. The data can be transmitted to the mobile electronic device 150 using electronic connectors (e.g., a micro-USB connector, proprietary connector, etc.), cables (e.g., USB cables, Ethernet cables, coaxial cables, etc.), and/or wirelessly (e.g., using BLUETOOTH, Near-Field Communication, Wi-Fi, etc.). The mobile electronic device 150 can be a smartphone, tablet, laptop, or other similar portable electronic device. In some embodiments, power is delivered to the camera 140 from the mobile electronic device 150 through the electrical connectors and/or cables.

The imaging system 100 can be configured to leverage the computing power, data storage, and/or battery power of the mobile electronic device 150 to provide image processing capabilities, power, image storage, and the like for the camera 140. By off-loading these functions from the camera 140 to the mobile electronic device 150, the camera can have a cost-effective design. For example, the camera 140 can be configured to consume relatively little electronic power (e.g., reducing costs associated with providing power), relatively little computational power (e.g., reducing costs associated with providing powerful processors), and/or relatively little data storage (e.g., reducing costs associated with providing digital storage on the camera 140). This can reduce costs associated with manufacturing the camera 140 due at least in part to the camera 140 being configured to provide relatively little computational power, data storage, and/or power, because the imaging system 100 leverages the superior capabilities of the mobile electronic device 150 to perform image processing, data storage, and the like.

Example Imaging System Configured to Acquire Flat Field Images

Figure 2A:
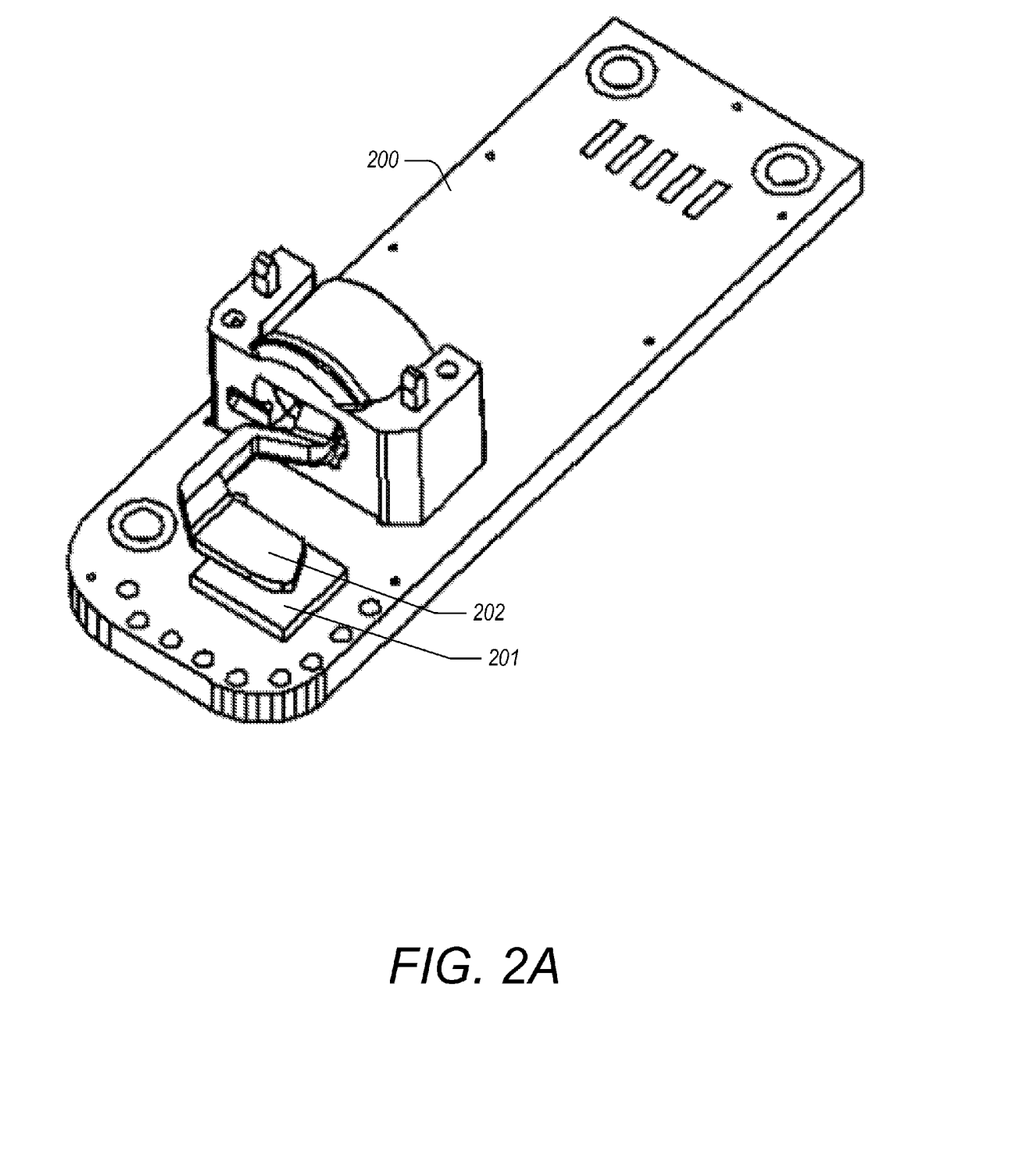
FIGS. 2A and 2B illustrate an example embodiment of an infrared camera core.
Figure 2B:
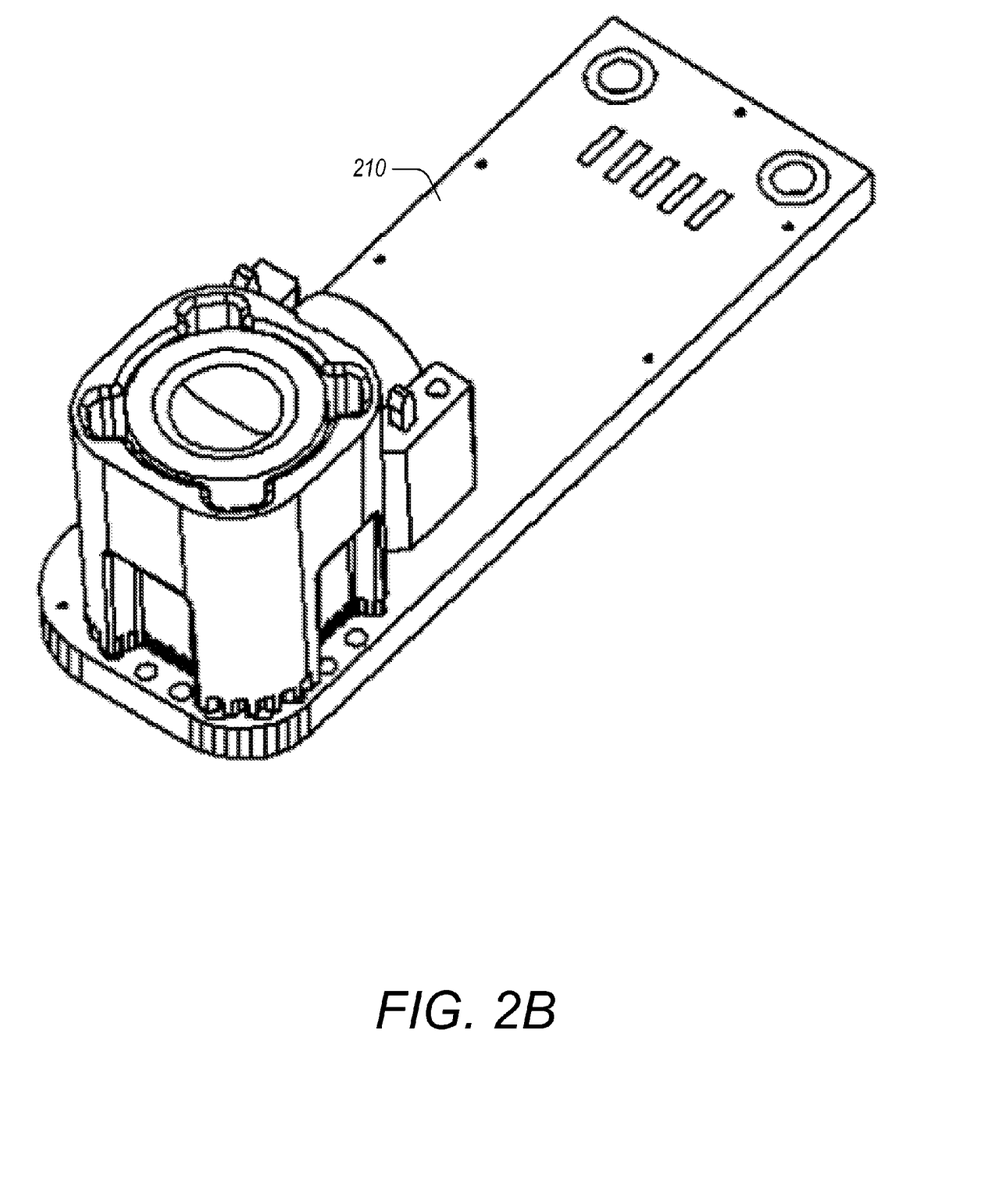

FIGS. 2A and 2B illustrate an exemplary camera core, the camera core 200 being partially assembled (as illustrated in FIG. 2A) and the camera core 210 being a fully assembled core. A focal plane array (FPA) 201 is positioned on the core 200 relative to shutter 202, such that the shutter 202 can be actuated to expose and to occlude the FPA 201. Various interface electronics may be part of the camera core 200 or part of a controller mated to the core 200.

Figure 3A:
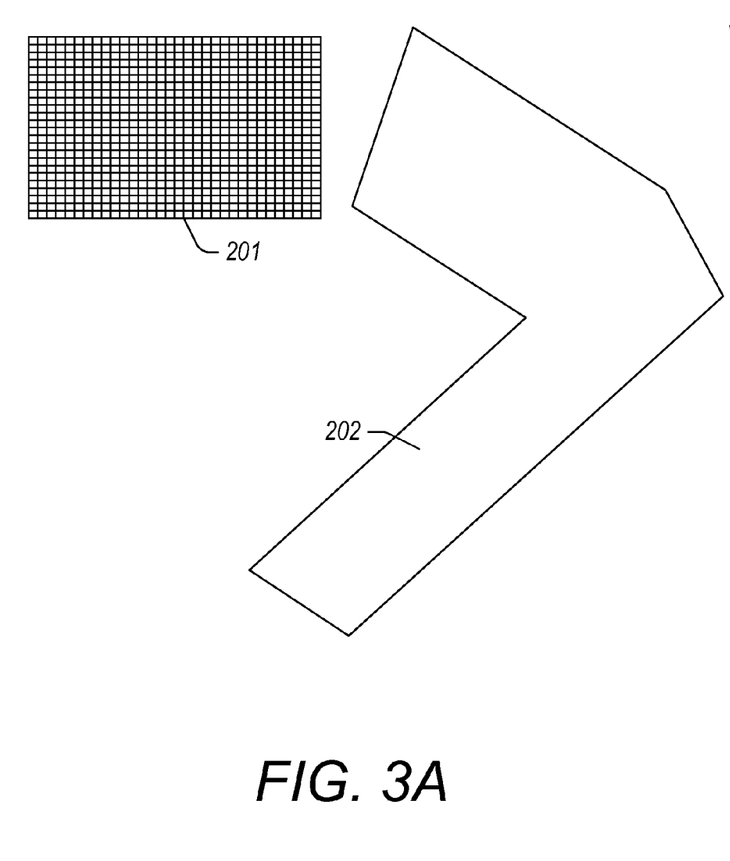
FIGS. 3A and 3B illustrate exemplary general operation of a shutter in an imaging system.
Figure 3B:
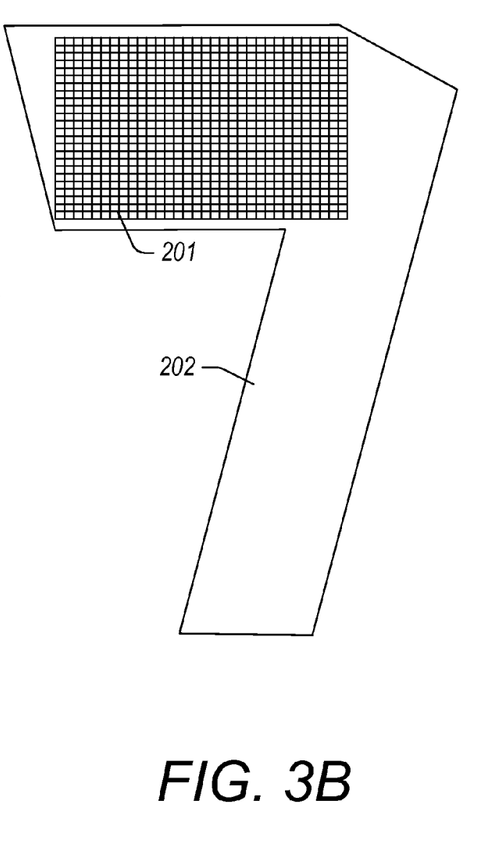

FIGS. 3A and 3B illustrate an example shutter 202 and an example FPA 201, with the shutter 202 exposing the FPA 201 (illustrated in FIG. 3A) and occluding the FPA 201 (illustrated in FIG. 3B). When the shutter 202 occludes the FPA, the shutter 202 can be said to be closed. In the closed position, the shutter 202 can be configured to cover the entire field of view of the FPA 201. In the closed position, image data can be acquired by the FPA 201. This acquired image data with the shutter 202 closed can be equivalent or similar to a flat field image of a dark field of view for a visible light imaging system or a cooled infrared imaging system. For an uncooled IR imager, images acquired with the shutter 202 closed may be equivalent to a flat field image at a temperature of the shutter 202.

Flat field scenes and images can be used to determine compensation factors for different gains and/or dark currents for pixels in an imaging system and/or to correct for non-uniformities in the imaging system. In general, a flat field scene can generally refer to a substantially uniform scene provided for an imaging sensor for the purposes of determining non-uniformities in the imaging sensor. Similarly, a flat field image can generally refer to image data of a flat field scene. A dark flat field scene or dark flat field image, or similarly a flat field image of a dark scene or field of view, can generally refer to a flat field scene that is substantially free of light. A flat field of a dark field of view can be used in a visible light imaging system and/or a cooled infrared imaging system to determine dark currents in pixels in an imaging array (e.g., currents or signals in pixels with no light incident on the pixels). For an uncooled infrared imager, the shutter 202 may radiate infrared light with an intensity corresponding to a temperature of the shutter 202. Thus, with the shutter 202 closed for an uncooled infrared imager, images acquired with the shutter 202 closed are generally not flat field images of a dark field of view, but are flat field images with incident light intensity corresponding to a temperature of the shutter 202. A flat field image can be used to determine non-uniformities by determining pixel-to-pixel variations because ideally the pixels in a flat field image should have approximately the same values. Similarly, a flat field image of a dark field of view can be used to determine pixel dark currents because ideally pixel intensity values should be substantially equal to 0 where there is no incident radiation. Correction factors can be determined to adjust pixel values to account for dark pixel currents and/or non-uniformities between pixels. These correction factors can then be applied to images acquired with the shutter open, thereby compensating for pixel offset values, pixel dark currents, pixel non-uniformities, or any combination of these.

As described herein, non-image signals can contribute significantly to signals readout from pixels in some imaging arrays. These non-image signals can be correlated to a temperature of the imaging array. For uncooled infrared imagers, in certain implementations, images acquired with the shutter 202 in the closed position can be approximated as flat field images with an intensity corresponding to the temperature of the shutter 202. The correction factors, such as pixel offset values, determined using these flat field images thus incorporate the temperature of the imaging array due at least in part to the temperature of the shutter 202 behaving similarly to the temperature of the imaging array. For example, changes in the temperature of the shutter 202 track changes in the temperature of the imaging array. Thus, using flat field images with the shutter 202 closed in uncooled infrared imagers allows for correction factors to be determined that are affected by temperature in a way that is similar to images of scenes (e.g., images acquired with the shutter 202 open).

To determine non-uniformity correction factors, such as pixel offset values, a frame (or multiple frames) of image data may be acquired with the shutter 202 closed. The acquired image data from each pixel may be used by various signal processing techniques to improve the quality of frames of image data acquired with the shutter 202 open. The acquired image data with the shutter 202 closed can provide information used to correct or compensate for drift and offset effects in the imaging array on a pixel-by-pixel basis. Typically, shutter-based data correction is used in infrared imagers where the signals dependent on detected radiation are often small compared to bias voltages, pixel signal drifts, and/or pixel-to-pixel non-uniformities. The systems and methods disclosed herein may be beneficial, in particular, to imaging systems sensitive to light in the visible portion of the spectrum, such as those imaging systems used in photometry or low-light applications.

In an ideal imaging system, pixel offset values would be determined and known for each frame of image data acquired. However, it may not be practical or beneficial to constantly monitor pixel offset values. For example, determining non-uniformity corrections can involve closing the shutter and it is usually desirable to operate the shutter as infrequently as practicable to maintain image quality. Closing the shutter may interrupt imaging, for example, as well as use power and make audible noise. Therefore it is often desirable use the shutter sparingly and/or during specific limited times, such as a calibration cycle, to acquire some offset data and then to extrapolate that data to predict offsets. This can result in accurate offset data applicable for relatively long periods of time using the imaging system without requiring frequent shutter closures to image the flat field.

However, as described herein, offset errors in some imaging systems may be significantly affected by the temperature of the imaging array, such as the temperature of the FPA. Accordingly, the systems and methods disclosed herein can be configured to determine pixel offset values more frequently when it is likely that the temperature will change fairly rapidly and less frequently when it is likely that the temperature is relatively stable. For example, temperature changes affecting pixel offset values may be more pronounced during a period just after the imaging system is powered up (warm-up time), and then may settle down as the temperature of the imaging system stabilizes. Similarly, changes in ambient temperature, such as taking an imaging system from an indoor location to an outdoor environment, may also affect pixel offset values. Accordingly, during startup the imaging system can be configured to determine pixel offset values relatively frequently (e.g., once over one second or few seconds, once every 30 frames, once every 60 frames, etc.) and can then reduce the frequency of shutter closures to once every minute or once every few minutes. Similarly, the imaging system can be configured to determine or update pixel offset values when a change in temperature has been detected, such as a change in temperature above a tailored threshold.

As described herein, the majority of the change in pixel offset values may be due to temperature changes at the imaging array. To correlate changes in pixel offset values with temperature changes, an FPA can have a built-in temperature sensor on the readout and/or detector array substrates. When flat field measurements are made, for example, these measurements can be correlated with the measured temperature value from the temperature sensor. A number of flat field data sets may be acquired at different temperatures, either during manufacture and test of the imager and/or periodically during use. This information can be used to determine functions that characterize the pixel offset values as a function of measured temperature. However, on-chip temperature sensors may not be desirable or sufficiently accurate in some imaging systems. The temperature sensors themselves may add to circuit complexity, size, and power consumption, which may be disadvantageous for certain imaging systems. Furthermore, temperature sensors may also drift over time. Particularly, for low-cost, mass-produced devices, accurate and dependable temperature measurements may not be practical. Thus, the systems and methods disclosed herein can advantageously be configured to predict offset variations without the use of temperature measurements.

Examples of Determining Pixel Offset Values as a Function of Time

Figure 4:
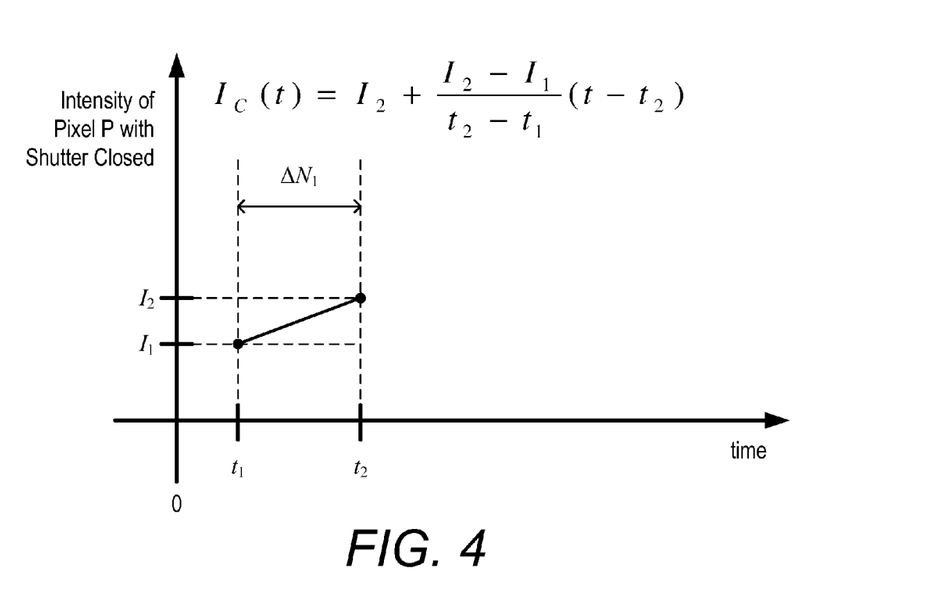
FIGS. 4-6 illustrate examples of determining offset values for a pixel to predict and to account for changes in the offset value over time.
Figure 5:
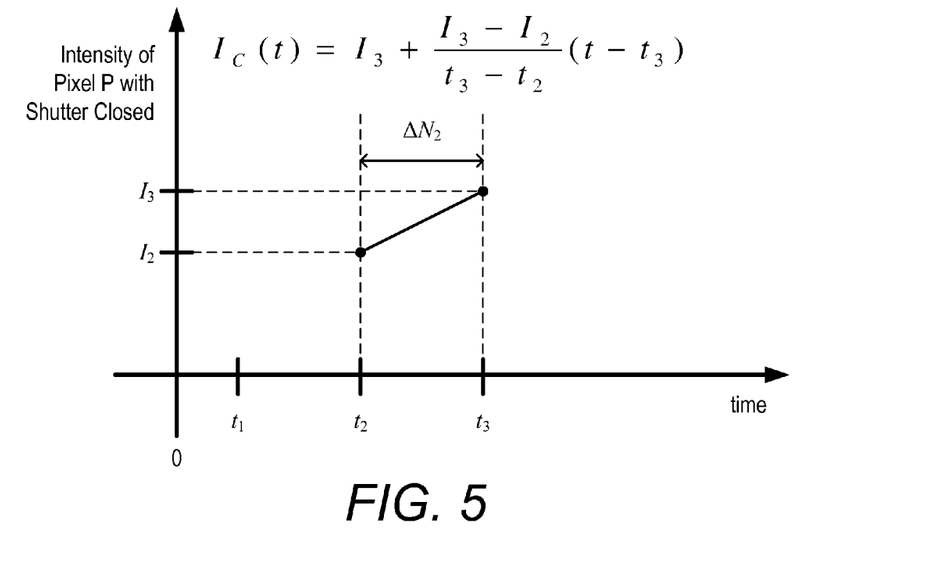
Figure 6:
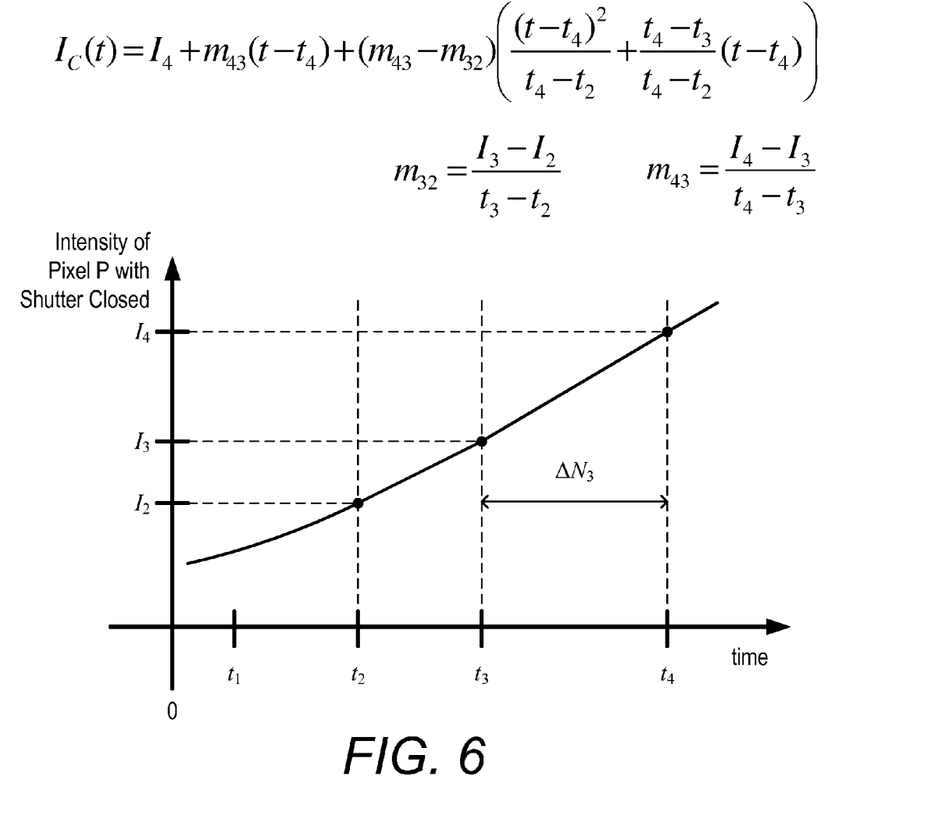

FIGS. 4-6 illustrate examples of determining offset values for a pixel to predict and to account for changes in the offset value over time. As used herein, the offset values can refer, in general, to pixel values that are offset from a uniform response when acquiring flat field data. The uniform response can be determined in a number of ways, such as averaging pixel values in flat field data or the like. In contrast to correlating measured flat field data with measured temperature, two or more flat field data sets can be acquired at known times to determine a pixel-by-pixel function of time that is predictive of offset value changes over time. It may be advantageous to use a function of time rather than temperature due at least in part to imaging systems being able to accurately the time between acquired data. For instance, the frame rate of an imaging system may be highly accurate and repeatable.

A variety of different functions may be used to characterize the offset drift as a function of time on a pixel-by-pixel basis. For example, the function can depend at least in part on the number of data points being used to determine the function. In certain implementations, a linear function can be used where there are two or more data points and a quadratic function can be used where there are three or more data points. In various implementations, Lagrange interpolation techniques can be used to extrapolate pixel offset values based on two or more data points. In some embodiments, the function type (e.g., linear vs. quadratic) can be based on differing numbers of data points and/or on where the imaging system is in its operating cycle.

With reference to FIG. 4, the time axis starts at power-on of an imaging system. At a time $t_1$ the shutter is closed and a frame of flat field data is acquired, represented on the graph as $I_1$, the intensity measured for a given pixel at a first time, $t_1$. In some embodiments, the first flat field data set may be acquired after a relatively short time after power-on (e.g., about 30 frames). After another relatively short time period (e.g., about 30 frames), represented as $\Delta N_1$, a second flat field frame is acquired, $I_2$, at a second time, $t_2$. At this point, a linear function of time can be produced, an illustrative example of which is the formula shown in FIG. 4. The offset value function, $I_c(t)$, produces a predictive offset correction value, $I_c$, which is a function of time, t, for each pixel. Any image data acquired with the shutter open after the second time, $t_2$, can be adjusted using a predictive offset correction value, $I_c$, calculated for each pixel as a function of the time the image data is acquired. This value can be used to adjust the image data to compensate for pixel offset drift and variation or non-uniformity of the pixels. The collection of offset value functions for the pixels in the imaging array represents a prediction of flat field data at a time, t, later than the time $t_2$. In some embodiments, the predicted flat field data (e.g., the set of predicted pixel offset values at a particular time) is subtracted from the image data as an offset correction or the predicted flat field data can be normalized before using it to adjust acquired image data. For example, an average pixel value can be determined for a flat field image. For each pixel, deviation from the average can be determined as the offset value for that pixel. As another example, the average pixel value calculated for a flat field image can be used to normalize pixel offset values. In some embodiments, the imaging system can be configured to not display image data acquired with the shutter open until after $t_2$ and initial offset correction functions are produced and used. In some embodiments, if $t_2$ is on the order of about 60 frames after start-up, a few seconds may elapse before an image is displayed. In certain embodiments, an initial flat field data set is acquired and used as an estimate of the pixel offset values (e.g., the initial flat field data set is used to adjust image data of a scene) until a second flat field data set is acquired and an offset value function is produced.

With reference to FIG. 5, after another time period, $\Delta N_2$, which again may be relatively short (e.g., about 30 frames), the shutter can be closed again and another flat field data set, $I_3$, can be acquired at time $t_3$. In the illustrative example, another linear equation is fit to points $I_3$ and $I_2$, and an example formula is derived, as shown in FIG. 5. For subsequent image data of a scene (e.g., images acquired with the shutter open after time $t_3$), the offset value function per pixel, $I_{c,i}$, determined using the most recent flat field data set is used to adjust pixel values to derive adjusted image data, $P_a$. The offset value function, $I_c$, may be updated over time by intermittently closing the shutter and acquiring flat field data sets while the shutter is closed. When image data of a scene is acquired, the most recent offset value functions can be used to adjust the image due at least in part to the offset value function predicting pixel offset drift as a function of time. FIGS. 4 and 5 illustrate the function $I_c(t)$ as being a linear fit to two consecutive measurements (e.g., $I_n$ and $I_{n+1}$). However, any two data points may be used, including consecutive or non-consecutive data points (e.g., $I_n$ and $I_{n+2}$). Furthermore, more than two data points may be used to determine the offset value function.

Using a linear equation for the offset value function may be suitable for the first few seconds of operation as well as to represent long term behavior as well. It has been observed that once an exemplary microbolometer FPA stabilizes, it is sufficient to acquire flat field data on the order of once every few minutes to update the offset value function. In some embodiments, the offset value function can be updated every few seconds for a few minutes after powering up the imaging system, and then reduced to a rate of once every few minutes thereafter. In certain embodiments, for an imaging system with intelligent control, the rate at which the imaging system acquires flat field data to update the offset value function can vary depending on operational parameters. For example, the rate can be adjusted by examining the change, or average changes over all pixels, between the most recent flat field data set and the previous flat field data set. If the change exceeds a threshold, the rate can be increase, for example. In some embodiments, the imaging system can monitor the change in temperature and trigger acquisition of flat field data if the change in temperature exceeds a threshold. Similarly, if the change in temperature or the rate of change of temperature is exceeds temperature thresholds, the rate at which flat field data is acquired can be adjusted. Other methods for keying acquisition of flat field data or modifying the rate of acquisition of flat field data can be used. For example, if the time since the last acquired flat field data exceeds a threshold, then another flat field data set can be acquired. As another example, if the time since the last acquired flat field data exceeds and threshold and a temperature change exceeds a temperature change threshold, then another flat field data set can be acquired and/or the rate of acquisition of flat field data can increase. As another example, the time since power-up can be monitored, and a first set of rules can be applied during a first period after startup and a second set of rules can be applied after the first period. Additional periods may be used as well.

As illustrated in FIG. 6, after another time period, $\Delta N_3$, which may be a longer period than the previous two time periods $\Delta N_1$ and $\Delta N_2$ (e.g., $\Delta N_3$ is about 60 frames), it may be appropriate to change the offset value function, $I_c(t)$, to be non-linear. For example, the function can be a quadratic equation fit to data points $t_2$, $t_3$, and $t_4$, as shown by the example formula in FIG. 6. In certain implementations, Lagrangian interpolation techniques may be used to determine the offset value function. At this point it may be acceptable to leave the shutter open for a longer period of time before acquiring the next flat field data set.

In some embodiments, higher order equations may be used on consecutive or non-consecutive data sets. An exemplary formula for a quadratic fit to three points is shown in FIG. 6, but other functions configured to fit three or more data points may also be used.

An imaging system, such as the imaging system 100 described herein with reference to FIGS. 1A and 1B, can be configured to adjust acquired image data based at least in part on estimated offset values for pixels in the image data. This adjustment can be performed as part of a signal processing chain comprising one or more signal processing modules, such as the modules described herein with reference to FIGS. 1A and 1B. For example, the non-uniformity correction module 106 described herein with reference to FIGS. 1A and 1B can be configured to apply an updated offset value function to adjust image data to account for pixel drift over time. In some embodiments, the non-uniformity correction module 106 can determine the offset value function by analyzing two or more sets of image data acquired when a shutter occludes an imaging sensor. In some embodiments, the non-uniformity correction module 106 retrieves the offset value function from data storage or physical memory.

Figure 7:
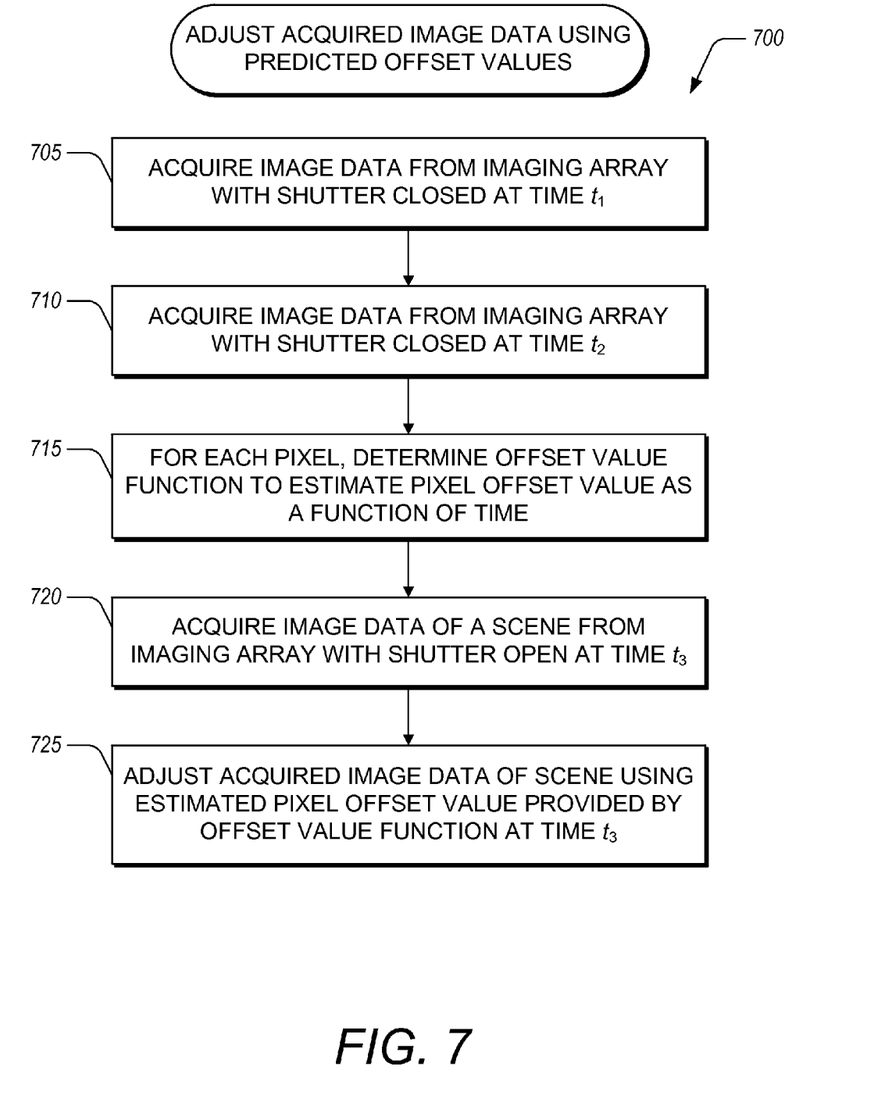
FIG. 7 illustrates a flow chart of an example method for adjusting an acquired image using predicted pixel offset values.

Example Method for Adjusting an Acquired Image Using Predicted Pixel Offset Values FIG. 7 illustrates a flow chart of an example method 700 for adjusting an acquired image using predicted pixel offset values. The method 700 can be implemented using one or more hardware components in an imaging system or image processing system. For ease of description, the method 700 will be described as being performed by the imaging system 100 described herein with reference to FIGS. 1A and 1B. However, one or more of the steps of the method 700 can be performed by any module or combination of modules in the imaging system 100. Similarly, any individual step can be performed by a combination of modules in the imaging system 100.

In block 705, the imaging system acquires image data from an imaging array with a shutter occluding the imaging array at a first time, $t_1$. The flat field data acquired at the first time can be stored in a permanent or temporary data storage. In block 710, the imaging system acquires image data from the imaging array with the shutter occluding the imaging array at a second time after the first time, $t_2 > t_1$. The flat field data acquired at the second time can also be stored in a permanent or temporary data storage. In some embodiments, the first flat field data (or the flat field data acquired at the first time) and the second flat field data (or the flat field data acquired at the second time) can be discarded after an offset value function is determined in block 715 below.

In block 715, the imaging system determines, for individual pixels, an offset value function configured to determine an estimate of an offset value of the individual pixel at a later time, $I_{c,i}(t)$, by fitting an equation to first flat field pixel values, $I_{1i}$, and second flat field pixel values, $I_{2i}$. The offset value function can represent, in some embodiments, deviation from a uniform response for individual pixels. The uniform response can be calculated based on an average pixel value for a particular flat field image, a maximum value, a minimum value, a median value, or another statistical calculation. For an individual pixel, the offset value function can be configured to characterize a pixel's deviation from the flat field response, however defined, as a function of time. This deviation from the flat field response can be normalized, in some embodiments. For example, it can be normalized to the flat field response value. The offset value function can be a linear function of time. The offset value function can be a quadratic function of time. The offset value function can be determined using Lagrangian interpolation techniques. Other non-linear functions can be used as well to represent the offset value as a function of time.

In block 720, the imaging system acquires image data of a scene from the imaging array with the shutter exposing the imaging array at a third time after the second time, $t_3 > t_2$. In block 725, the imaging system adjusts the acquired image data of the scene using the offset value function. The adjusted pixel values of the image data, $I_{a,i}$, can be the acquired image data of the scene, $I_i$, adjusted using the estimated offset value, $I_{c,i}$, estimated at the acquisition time, $t_3$:$I_{c,i}(t_3)$.

In some embodiments, the offset value function can be updated at times later than the third time by acquiring additional flat field data and updating the fit to the acquired data points. In certain implementations, the shutter is closed periodically at a first frequency (e.g., once every 30 frames) during a startup phase of the imaging system and closed periodically at a second frequency (e.g., once every 5 minutes) slower than the first rate after the startup phase.

The present disclosure provides for a function that does not utilize temperature as an input to determine offset corrections that can be frequently updated during a warm up phase and infrequently updated thereafter. This can balance targeted operational parameters such as accuracy of predicted offset correction values and infrequency of shutter closures. Such an offset correction may be used independently for systems with no temperature sensing or unreliable temperature sensing, or it can be employed with or as an adjunct to temperature-based methods. The systems and methods provide an extrapolation of offset values for times later than the latest update to the predictive offset value function. The disclosed systems and methods can also be configured to store image frames for later display or analysis such that offset correction values can be determined at a later time during image processing. In some embodiments, the offset value functions can be determined and used to extrapolate correction values backwards in time. In some embodiments, the offset value functions can be used to provide offset correction for data acquired earlier than the points used in determining the functions.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the LUT described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for offset correction in an imaging system comprising a shutter, an array of photodetectors, and detector electronic circuitry for reading out image data from the array of photodetectors, the method comprising:
    acquiring, with the shutter closed to occlude the array of photodetectors, image data from the array of photodetectors at a first time, the image data comprising an array of pixel values;
    acquiring, with the shutter closed to occlude the array of photodetectors, image data from the array of photodetectors at a second time after the first time;
    determining an offset value function for individual pixels in the array of pixel values by fitting a function to the image data acquired at the first time and the image data acquired at the second time, the offset value function configured to estimate a flat field image data value for an individual pixel at a time later than the second time;
    acquiring, with the shutter open to expose the array of photodetectors, image data of a scene at a third time later than the second time; and
    adjusting the image data of the scene using the offset value function to estimate, for individual pixels, an offset value at the third time to correct for offset drift of the imaging system at the third time.

2. The method of claim 1 further comprising:
    closing the shutter intermittently after the third time;
    acquiring image data with the shutter closed at a plurality of shutter closed times; and
    updating the offset value function based on image data acquired with the shutter closed at a latest shutter closed time and image data acquired with the shutter closed at one or more shutter closed times prior to the latest shutter closed time.

3. The method of claim 1 further comprising:
    acquiring, with the shutter open, image data of the scene at a shutter open time after the latest shutter closed time; and
    adjusting the image data acquired at the shutter open time after the latest shutter closed time using the updated offset value function.

4. The method of claim 1, wherein adjusting comprises subtracting for individual pixels a value based on the estimated offset value from the acquired image data of the scene.

5. The method of claim 1, wherein the offset value function comprises a linear function fit to the image data acquired at the first time and the image data acquired at the second time.

6. The method of claim 2, wherein the offset value function comprises a linear function fit to the image data acquired at non-consecutive shutter closed times.

7. The method of claim 2, wherein the offset value function comprises a quadratic function fit to image data acquired at each of at least three shutter closed times.

8. The method of claim 1, wherein the array of photodetectors and the detector electronic circuitry form an infrared focal plane array in a thermal imaging camera.

9. The method of claim 1, wherein the image data of the scene is adjusted without utilizing a temperature measurement of the imaging array.

10. The method of claim 1, wherein the offset value function does not utilize temperature as an input.

11. The method of claim 1 further comprising displaying the adjusted image data on a display of the imaging system.

12. An imaging system comprising:
    an imaging array comprising an infrared focal plane array;
    a shutter configured to occlude the imaging array in a closed position and to expose the imaging array in an open position; and
    a signal processing system configured to adjust image data from the imaging array, the image data acquired at a shutter open time when the shutter is in the open position, the signal processing system configured to adjust the image data using an offset value function determined based at least in part on a fit to flat field data acquired at two or more shutter closed times previous to the shutter open time, the offset value function depending on time as an input,
    wherein the flat field data comprises image data acquired with the imaging array when the shutter is in the closed position.

13. The imaging system of claim 12, wherein the shutter is configured to transition to the closed position with a first frequency during a first time period and with a second frequency less than the first frequency during a second time period.

14. The imaging system of claim 13, wherein the first time period is less than or equal to one minute.

15. The imaging system of claim 14, wherein the first frequency is less than or equal to once every 30 frames.

* * * * *